United States Patent [19]

Potter

[11] 4,406,676
[45] Sep. 27, 1983

[54] METHOD AND APPARATUS FOR FILTERING A STREAM OF GAS WHILE DRYING WASTE LIGNOCELLULOSIC MATERIAL

[76] Inventor: George R. Potter, 784 Beaver Creek Rd., Coos Bay, Oreg. 97470

[21] Appl. No.: 340,091

[22] Filed: Jan. 18, 1982

Related U.S. Application Data

[63] Continuation-in-part of Ser. No. 212,311, Dec. 2, 1980, abandoned.

[51] Int. Cl.³ .................. B01D 46/34; F26B 17/12
[52] U.S. Cl. .................... 55/98; 55/271; 55/474; 55/479; 55/518; 34/9.5; 34/134; 34/56; 34/82; 34/174
[58] Field of Search .............. 55/21, 96–99, 55/213, 217, 262, 282, 290, 338, 385 R, 422, 466, 474, 475, 479, 515, 516–519, DIG. 10; 110/204, 216, 217, 221, 345; 432/64–66, 72; 34/9.5, 13.4, 13.8, 56, 82, 174

[56] References Cited

U.S. PATENT DOCUMENTS

| | | | |
|---|---|---|---|
| 746,254 | 12/1903 | Bagaley | 55/528 |
| 1,482,812 | 2/1924 | Roberts | 34/174 |
| 1,489,846 | 4/1924 | O'Connell et al. | 34/174 |
| 1,707,930 | 4/1929 | Bennett | 34/174 |
| 1,731,223 | 10/1929 | Brady | 55/479 |
| 1,787,878 | 1/1931 | Warden-Stevens | 34/174 |
| 2,171,652 | 9/1939 | Haney | 34/174 |
| 2,799,099 | 7/1957 | Williams et al. | 34/56 |
| 3,011,938 | 12/1961 | Chapman | 162/207 |
| 3,087,618 | 4/1963 | Musschoot et al. | 209/393 |
| 3,332,215 | 7/1967 | Revell | 55/213 |
| 3,708,210 | 1/1973 | Stähel et al. | 55/97 |
| 3,718,536 | 2/1973 | Downs et al. | 156/62.2 |
| 3,800,508 | 4/1974 | Zenz | 55/96 |
| 3,826,208 | 7/1974 | Williams | 110/220 |
| 3,998,933 | 12/1976 | Henderson, Jr. et al. | 55/98 |
| 4,114,289 | 9/1978 | Boulet | 34/174 |
| 4,220,478 | 9/1980 | Schuff | 55/474 |
| 4,226,715 | 10/1980 | Niederer et al. | 55/213 |
| 4,250,038 | 2/1981 | Dryden | 209/393 |
| 4,258,476 | 3/1981 | Gaughey | 34/174 |
| 4,308,669 | 1/1982 | Noyes et al. | 34/174 |

FOREIGN PATENT DOCUMENTS

| | | | |
|---|---|---|---|
| 595049 | 3/1960 | Canada | 55/99 |
| 173808 | 12/1904 | Fed. Rep. of Germany | 55/474 |
| 1062580 | 4/1954 | France | 55/479 |
| 894 | of 1913 | United Kingdom | 55/217 |
| 253751 | 11/1970 | U.S.S.R. | 55/474 |

*Primary Examiner*—David L. Lacey
*Attorney, Agent, or Firm*—Chernoff, Vilhauer, McClung, Birdwell & Stenzel

[57] ABSTRACT

A method for using comminuted lignocellulosic waste material such as flake-like wood and bark chips which have been stored outside includes placing the material in a filter bed by movement in a first direction, and thereafter passing polluted effluent gas from a boiler furnace, for example through said filter bed in a direction generally perpendicular to said first direction to filter pollutants from said effluent gas and simultaneously dry the comminuted lignocellulosic waste material. During drying of the material a portion of the material on the gas outlet side of the filter bed, toward which the effluent gas proceeds, is maintained at a moisture content which is greater than the average moisture content of the lignocellulosic material at the time it is placed into the filter bed. The lignocellulosic waste material is thereafter used as furnace fuel or as a furnace for an industrial process. A filter/dryer apparatus includes a vertically oriented filter bed for holding a quantity of filter material, with downwardly sloping, upwardly convex, horizontally extending louvers on a gas inlet side to retain the filter material. On a gas outlet side, a grid of vertical triangular bars defines a slotted surface to retain the filter material. The grid is reciprocatingly movable up and down and a horizontally movable shuttle is located beneath the filter bed. Means coordinate the movement of the grid and shuttle to move filter material downward through the filter bed of the apparatus.

9 Claims, 15 Drawing Figures

METHOD AND APPARATUS FOR FILTERING A STREAM OF GAS WHILE DRYING WASTE LIGNOCELLULOSIC MATERIAL

This application is a continuation-in-part of copending application Ser. No. 212,311, filed Dec. 2, 1980, now abandoned.

BACKGROUND OF THE INVENTION

The present invention is directed to improvements in the utilization and disposal of waste lignocellulosic material generated by processing plants, and particularly of wood waste generated by the wood products industry.

In the wood products industry, huge quantities of wood waste material such as sawdust, shavings, chips and bark are generated by lumber and plywood mills. In other industries utilizing lignocellulosic raw materials, such as sugar cane processing, similar large quantities of waste lignocellulosic material such as bagasse are produced. Disposal of these waste materials in a useful way has primarily been either by using them as a fuel or as a raw material for particle board manufacture. As a fuel the waste materials present problems in that they normally have too high a moisture content for efficient burning and therefore must be dried first, which consumes substantial amounts of energy. For use of the waste materials in particle board manufacture, the energy-consuming drying requirement is even more of a problem than it is with respect to use of the material as a fuel, since a greater degree of drying is required to render the material suitable as a particle board furnish. Generally speaking, wood waste materials originally have moisture content in the range of 50% to 60% by weight and should be dried to 30% to 35% moisture content for use as a fuel and to approximately 9% moisture content for use as a particle board material.

A totally separate problem which also has long plagued the wood products industry is the high levels of pollutants in stack gas emissions from wood processing plants. The problem exists not only with respect to stack gas effluents from furnaces or boilers utilizing wood wastes as fuel (where the problem is especially severe due to the difficulty in burning wood waste completely), but also from the gaseous effluent of wood dryers as well. In the case of wood waste combustion emissions, the primary pollutants include fly ash and unburned hydrocarbons, the latter in large part being submicron sized particles which are especially difficult to remove. Salt particles, also present, are also very small in size and difficult to remove from the gaseous effluent from wood-burning furnaces.

In the case of wood dryer emissions, the primary pollutants are condensible hydrocarbons distilled from the wood. These present special problems because of their gummy nature when condensed, which causes them to adhere to whatever equipment is used to remove them from the stack gas effluent, requiring frequent cleaning of the equipment.

The dryers used in the past to reduce the moisture content of waste lignocellulosic materials for use as furnace fuels, such as those disclosed in Caughey U.S. Pat. No. 4,258,476 of Mar. 31, 1981, Boulet U.S. Pat. No. 4,114,289 of Sept. 19, 1978, and Williams U.S. Pat. No. 3,826,208 of July 30, 1974, have also released significant quantities of pollutants such as dust and condensible hydrocarbons, requiring filtration of the gaseous exhaust from such dryers. Additionally, U.S. Pat. Nos. 4,258,476, 4,114,289, and 3,826,208 have disclosed use of effluent hot gases to dry lignocellulosic materials for use as furnace fuels. Such methods and apparatus for drying have, however, resulted in freeing quantities of potentially pollutant dust, etc. from the materials being dried, necessitating use of exhaust stream cyclone separators, filters, and the like to limit air pollution.

The filtration of effluent gases through filter beds of finely divided granular particles of various compositions has long been practiced, as evidenced by such disclosures as those of Rigg U.S. Pat. No. 1,095,676 of May 5, 1914, Squires U.S. Pat. No. 3,296,755 of Jan. 10, 1967, Zenz U.S. Pat. No. 3,770,388 of Nov. 6, 1973, Zenz U.S. Pat. No. 3,800,508 of Apr. 2, 1974, and Squires U.S. Pat. No. 4,006,533 of Feb. 8, 1977. However such filter bed gas treatment processes have not taught how compatibly to maximize the filtration of pollutants, particularly of the submicron size, from the effluent gases while simultaneously causing significant drying of the filter material. This is because effective filtration and effective drying are basically incompatible due to the reliance of filtration upon high moisture content of the filter material to "wet" solid pollutants of small size and condense and wet volatile pollutants.

Moreover, the nongranular, generally flake-like nature of comminuted wood waste particles has been thought to render them unfit as a filter bed material because of the substantial resistance to the passage of gaseous effluents therethrough which the overlapping flake-like particles would cause, resulting in a substantial back pressure on the stack gases.

In addition, filter beds have not generally been considered appropriate for filtering stack gases containing gummy or sticky condensible hydrocarbon pollutants of the type generated from the drying of lumber and wood veneers because of the difficulty of attempting to clean the pollutant deposits off of the screens, louvers or vanes which contain the filter material in a filter bed.

Previous attempts to use comminuted lignocellulosic material as filter material have also met with problems of blockage of the perforations of a support membrane such as a woven screen material on the outlet side of the filter bed.

Apparatus and a method are needed, then, for utilizing lignocellulosic waste material for efficiently filtering pollutants including hydrocarbon distillates and submicron sized particles of salts, fly ash, and unburned hydrocarbon solids from a polluted stream of effluent gas, while simultaneously sufficiently drying the waste material to render it useful.

SUMMARY OF THE INVENTION

The present invention is directed to a system for utilizing comminuted waste lignocellulosic material as a filter bed material for effectively removing the above-mentioned types of pollutants from stack gas effluents while simultaneously compatibly drying the waste lignocellusic material for further use as a fuel or particle board material. The invention accomplishes this objective without requiring the consumption of valuable energy to accomplish the drying. When the lignocellulosic waste material is later used as a fuel, its thermal energy value is actually reinforced by the presence of combustible hydrocarbons which have accumulated thereon by adhesion or agglomeration during the filtration process.

Lignocellulosic waste material has been found to be a surprisingly effective filter medium even for submicron hydrocarbon emissions from combustion chambers and wood dryers, in accordance with the present invention, such effectiveness being particularly enhanced by, and also being dependent upon, the fact that moisture is being extracted from a portion, but not all, of the waste material during the gas filtration process in the manner to be described hereafter. Other major pollutants, such as fly ash and supermicron hydrocargons, are also effectively removed from a stream of effluent gas, using the apparatus and method of the present invention.

Impingement of hot effluent gas on the filter material near the gas inlet side of the filter bed results in some pollutants being deposited directly on the surfaces of the particles of filter material. At the same time, the heat carried by the gas is utilized in evaporating moisture from the filter material on the gas inlet side. A portion, but less than all, of this moisture later condenses and is accumulated in filter material located nearer to the gas outlet side of the filter bed, raising the moisture content of that portion of the filter material, at least temporarily. It is believed that much of such condensation occurs initially on the surfaces of minute particles or droplets of pollutants carried in the effluent gases, "wetting" such pollutants and causing them to fall from suspension in the effluent gas. Condensation of some of the previously evaporated moisture within the filter bed thus significantly enhances the accumulation of such pollutants on the surfaces of the particles of filter material located near the gas outlet side of the filter bed. It would seem that such condensation within the filter bed, while enhancing the pollutant filtering process, would simultaneously defeat the concurrent objective of drying the filter material for subsequent utilization. However, by condensing less than all of the previously evaporated moisture, the average moisture content of the filter material can be reduced satisfactorily even though a portion of the filter material actually becomes wetter due to the condensation. By recognizing this principle, and carrying out the filtering and drying processes simultaneously in accordance therewith, enhanced filtration of pollutants from gaseous effluents can be made compatible with effective drying of the filter material.

The filter material in the vertical filter beds is replenished according to the invention at a rate above that which would cause excessive drying of the filter material on the gas outlet side of the filter bed, but below that which would cause insufficient reduction of the average moisture content of the filter material. Such rate of replenishment, and the resultant time of retention of the lignocellulosic material in the filter bed, will of course vary depending upon such factors as the amount and type of pollutants in the particular gas being treated, the temperature and moisture content of the gas, the initial moisture content of the filter bed, the thickness of the filter bed and the ultimate use of the filter material after it is removed from the bed.

The problem of excessive pressure reduction and consequent excessive back pressure on effluent stack gas due to its passage through a nongranular filter bed of overlapping flake-like lignocellulosic particles, as opposed to passage through a granular material, is solved according to the present invention by moving the lignocellulosic particles loosely into the filter bed in a predetermined direction, as under the influence of gravity, and then directing the gaseous effluent through the bed in a direction generally perpendicular to the direction in which the particles were moved into the bed. The reason why such orientation of gas flow, relative to the direction of particle movement into the bed substantially reduces the resistance to gas flow through the bed, is not precisely determinable. However, it is believed that gravity flow of the particles into the bed probably tends to cause the flake-like particles to arrange their major surfaces predominantly perpendicular to the direction in which they are moved by gravity into the bed. Subsequently, directing the gas flow through the bed perpendicular to the direction in which the particles were moved into the bed would, according to this theory, cause the gas to flow past the flake-like particles predominantly parallel to their major surfaces, thereby minimizing the resistance to flow of the gas. Irrespective of the validity of this theory, however, the observed reduction in resistance to gas flow by the utilization of this method is substantial.

One suitable arrangement whereby such result can be accomplished is to orient the filter bed vertically with retaining support structures on each side such that the lignocellulosic material is moved into the bed by vertical descent, the gas thereafter flowing through the vertical bed in a generally horizontal direction.

Using a support structure which has openings smaller than the smallest particles of filter material on the gas outlet side of the filter bed results in entrapment of a high percentage of particulate pollutants. A preferred support structure for the gas outlet side of the filter bed incorporates vertically extending parallel bars held closely together as a grid to define an inner surface along which the filter material can slide downward without clogging the openings between adjacent parallel bars. Preferably the vertically oriented bars are of triangular cross section, the bases of the triangles being generally coplanar, with the smallest clearances between bars being located along the vertical edges of the inwardly-facing parallel surfaces of the bars. The grid thus defines openings through which the filtered gases may proceed after passing through the filter material contained in the filter bed, while the filter material is retained in the filter bed.

Removal of the dried lignocellulosic material from the filter bed for further utilization can be accomplished in an intermittent flow using apparatus of the present invention. The vertical support structure including the vertically oriented grid located on the gas outlet side of the filter bed is periodically raised and lowered. The weight of the filter material causes it to remain substantially stationary during the time when the grid is moving upwardly, and filter material moves downward under the combined influences of friction and gravity as the grid moves downward.

In the apparatus of the invention, a filter material supporting structure on the gas inlet side of the filter bed comprises parallel horizontal louvers whose top edges are sloped outwardly away from the filter material. The louvers are spaced appropriately close enough to the support structure of the gas outlet side to permit the filter material to form an individual bridge between each louver and the opposite structure of the gas outlet side of the filter bed. This prevents excessively dense compaction of the filter material at all levels within the filter apparatus, preserving freedom of gas flow through the filter material and thereby insuring ample flow of the hot gaseous effluent for drying the filter material and for filtration without development of excessive backpressure.

One particularly effective use of the lignocellulosic waste material is as a medium for filtering stack gases from a combustion chamber in which the dried filter material is then burned at a rate substantially no less than the rate at which the lignocellulosic material is removed from the filter bed. Thus all of the filter bed material can be directly conveyed into the combustion chamber with no requirement that any of it be stored or otherwise disposed of.

Accordingly it is a primary objective of the present invention to utilize waste lignocellulosic material as an effective filter for removing pollutants, including submicron sized particles of combustible hydrocarbon pollutants, from stack gases emitted from combustion chambers or dryers, while simultaneously compatibly drying such waste lignocellulosic material for subsequent use as a combustion fuel or particle board material.

It is a further objective of the present invention to provide an efficient filter which imposes a minimum amount of back pressure upon a stream of gas during its passage through filter material consisting at least primarily of overlapping flake-like waste lignocellulosic particles in a filter bed.

It is an important feature of the apparatus of the present invention that it includes a permeable support member on the gas outlet side of a vertically oriented filter bed, the support member including a grid comprising vertically oriented parallel bars of triangular shape spaced close to one another to define a flat surface including narrow vertical slots which increase in width from the interior toward the exterior of the filter bed.

It is another important feature of the apparatus of the present invention that it includes a a vertically oriented grid comprised of vertically oriented parallel members arranged for reciprocating vertical movement to move filter material downward through the filter bed in a controlled manner.

It is yet a further feature of the apparatus of the present invention that it includes a vertical array of convexly curved horizontally extending louvers located on a gas inlet side of the filter bed to promote downward movement and mixing of the filter material located nearest the gas inlet side of the filter bed.

It is an important advantage of the present invention that it provides a filter/dryer method and apparatus which provides better filtration of a stream of pollutant-laden gas than previously known while compatibly drying waste lignocellulosic filter material to ready it for use as a fuel or as a furnish for manufacture of particle board compositions and the like.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
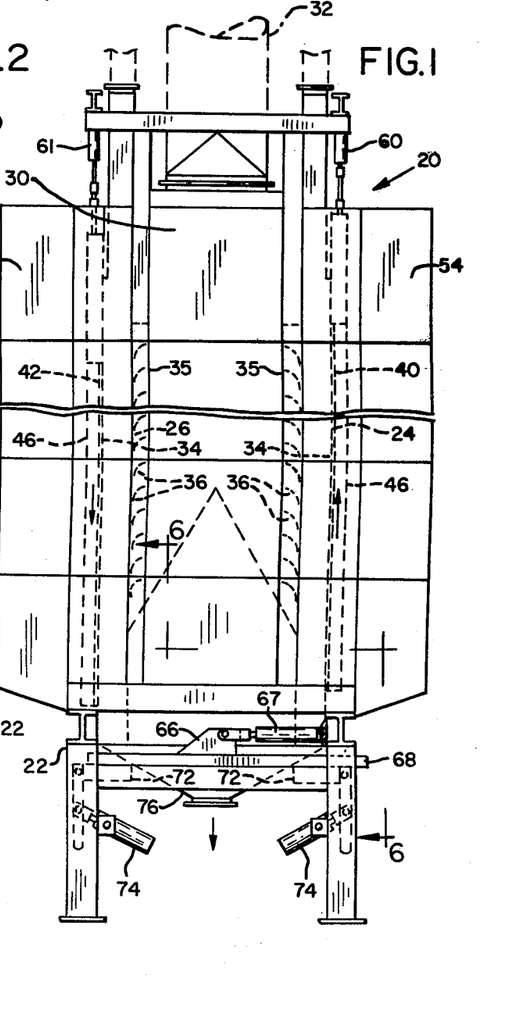
FIG. 1 is a simplified side elevational view of an exemplary filter/dryer apparatus usable in carrying out the method of the invention.
Figure 2:
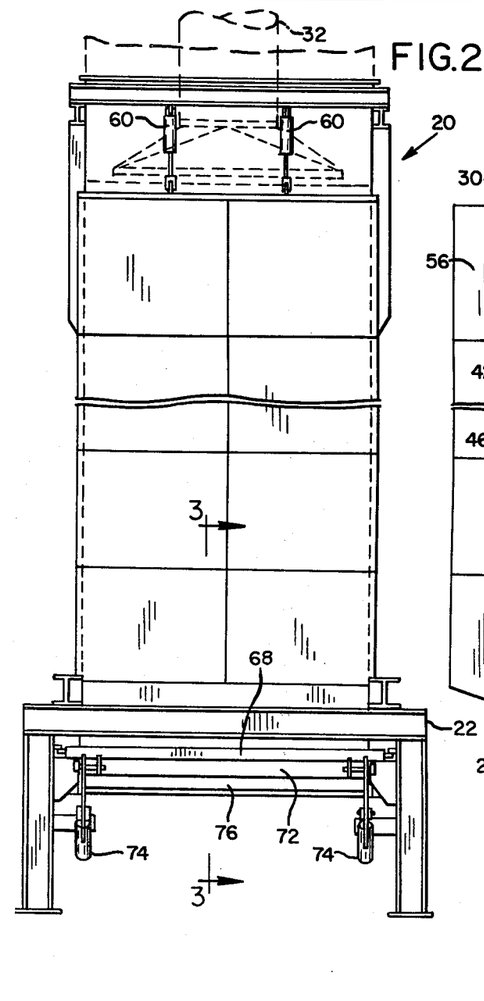
FIG. 2 is an end elevational view of the apparatus shown in FIG. 1.
Figure 3:
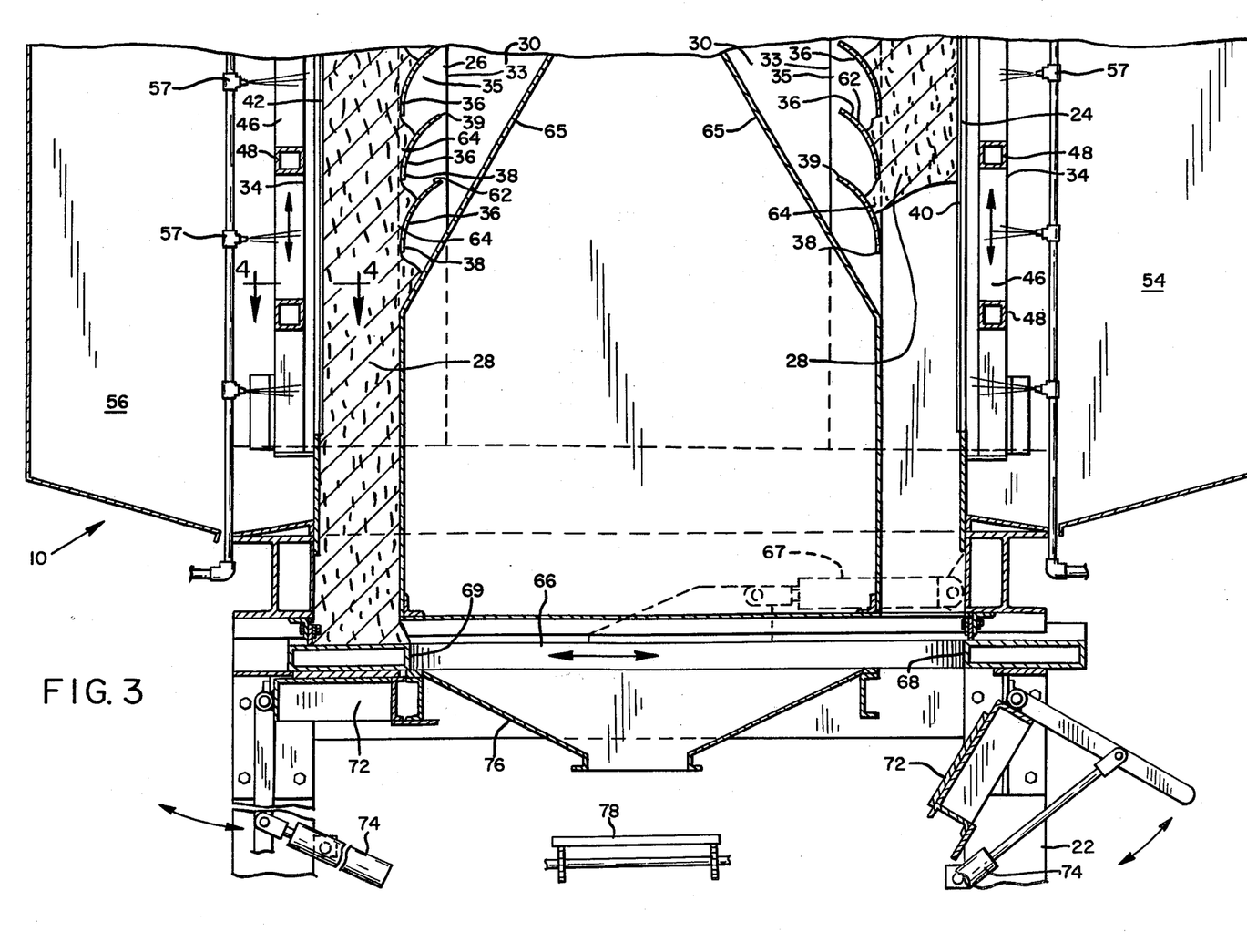
FIG. 3 is a sectional side elevational view, at an enlarged scale, of a portion of the apparatus of FIG. 1 taken along line 3—3 of FIG. 2.

The method of the present invention may best be described in connection with the description of an exemplary apparatus for filtering a stream of gaseous stack effluent, as from a boiler furnace, while evaporating excess moisture from a quantity of comminuted lignocellusoc filter material used to clean the gaseous effluent. Referring now first to FIGS. 1-3 of the drawings, an exemplary filter/dryer apparatus 20 usable in carrying out the method of the present invention may be seen to comprise a frame 22 which supports an enclosure including a pair of parallel, generally vertically oriented filter beds 24 and 26 for containing a quantity of comminuted lignocellulosic material 28 at times hereinafter referred to as filter material.

A gas inlet chamber 30 is located between the filter beds 24 and 26, an a gas inlet conduit 32 opens downwardly into the top of the gas inlet chamber 30.

Each filter bed 24 and 26 comprises a gas inlet side 33 and a gas outlet side 34, with the gas inlet side of each filter bed 24 or 26 having an upright panel 35, comprising a plurality of curved louvers 36 which extend horizontally and are arranged one above another to support the filter material 28. Each louver 36 slopes curvingly downward toward the interior of the filter bed 24 or 26 and is convex upwardly and toward the interior of the respective filter bed. Each louver 36 supports a quantity of lignocellulosic filter material 28, the louvers 36 being spaced closely enough above one another so that the filter material is retained within the filter bed rather than spilling between the louvers into the gas inlet chamber 30. A lower edge 38 of each louver extends nearly vertically downward, while an upper edge 39 slopes upwardly away from the interior of the filter bed. Within the gas-tight enclosure, the gas outlet side 34 of each filter bed 24 or 26 includes a grid 40 or 42.

Figure 4:
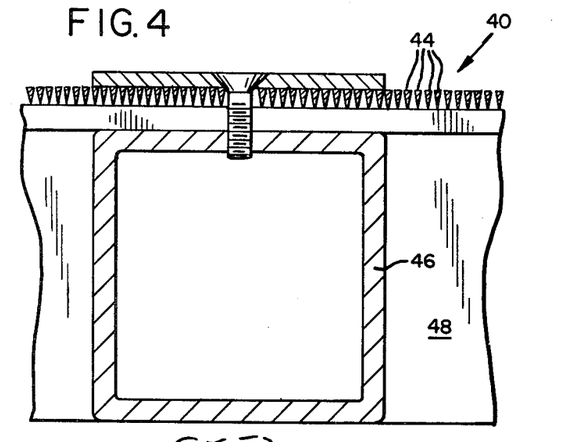
FIG. 4 is a fragmentary sectional top view, taken along line 4—4, of an exemplary grid included in the filter bed of the apparatus shown in FIG. 3, at an enlarged scale.
Figure 5:
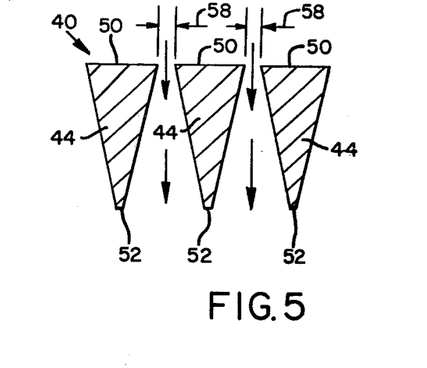
FIG. 5 is a fragmentary sectional top view of the grid shown in FIG. 4, at an enlarged scale.
Figure 6:
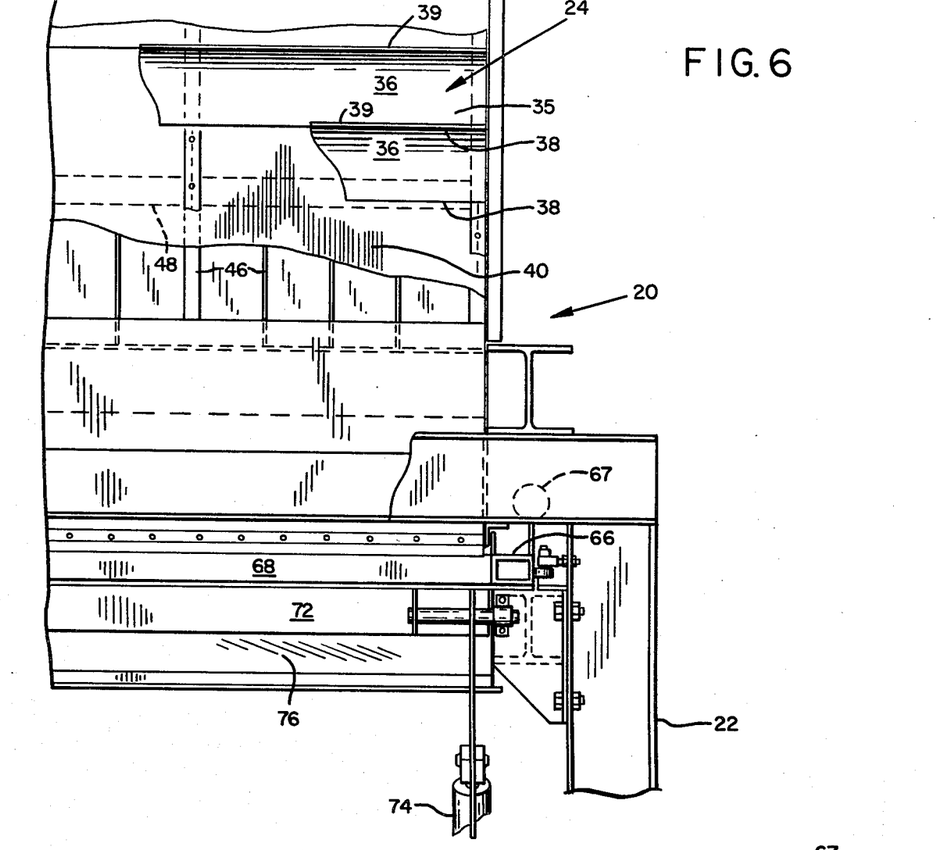
FIG. 6 is a partially cut away end elevational view of a detail of the apparatus shown in FIG. 1, at an enlarged scale, taken along line 6—6.

Referring now also to FIGS. 4 and 5, the grids 40 and 42 are composed of closely spaced vertically oriented parallel metal bars 44 reinforced by a framework of vertically oriented members 46 and horizontally oriented members 48. In a preferred type of grid 40 or 42, the vertical bars 44 are of isosceles triangular cross section and are mounted on the framework members 46 and 48 with the bases 50 of the triangles arranged in a substantially planar array facing toward the interior of the respective filter bed 24 or 26, while the apexes 52 of the triangles face toward the exterior of the filter beds 24 and 26. The interior side of each grid 40 or 42 thus provides a flat surface definfing many closely spaced narrow vertical slots between the the vertical bars 44. The bars 44 are separated from one another by a distance too small to allow escape of the particles of comminuted lignocellulosic filter material 28, yet sufficient to permit passage of an effluent gas as it is filtered.

A heat exchanger (not shown) is preferably provided in the gas inlet conduit 32 to reduce the temperature of effluent gases to a safe level and make use of the heat of the gas. Alternatively, a series of cold water sprays (not shown), each controlled by a thermostatically controlled, automatically operated valve, may be located in the gas inlet conduit 32, with the sprays oriented against the direction of flow of the gaseous effluent to cool the gases to a safe temperature.

Respective exhaust chambers 54 and 56 are connected to the gas outlet side 34 of each filter bed 24 and 26. A fan (not shown) may be provided in each exhaust chamber 54 and 56 to facilitate the flow of the gaseous stack effluent through the filter/dryer apparatus 20. Such a fan is ordinarily not needed, however, since the pressure drop through the apparatus is ordinarily slight.

Suitable conveyor apparatus (not shown) is provided to transport a sufficient supply of filter material 28 to the filter/dryer apparatus 20 to keep the filter beds 24 and 26 filled above the top of the panels 35 and grids 40 and 42 to provide a seal against the pressure of the effluent gas being filtered.

Among the lignocellulosic waste materials which may be used in the filter beds 24 and 26 are bark, wood chips, shavings, sawdust and comparable wood waste produced during operation of saw mills and plywood mills, communited into as small particles as desired by conventional hammer hogs. It should also be understood that virtually any other comminuted lignocellulosic material including, but not limited to, bagasse, straw, rice hulls, corn stalks, reeds, vegetable stems, cork, etc., may be used as the filter material 28. Moreover, each type of ligonocellulosic material may be used alone or in a mixture with one or more other types of lignocellulosic material.

In particular the material may, for example, be waste wood slab and bark from a sawmill or plywood mill which is commonly chipped or broken into small pieces by a hammer hog in order to facilitate handling and storage. Such material, known as hog fuel, is commonly stored in large outdoor stacks, where the material is exposed to rain and becomes moisture-laden. Such hog fuel ordinarily includes a large proportion of flake-like particles, such as chips and shavings having length and breadth dimensions which are greater than their thickness. Such particles have a wide range of sizes, including a large proportion of particles whose largest dimension is a millimeter or less.

In the use as a filter material of the pulverized wood waste known commonly in the polywood and lumber industry as hog fuel, a spacing 58 (FIG. 5) of about 0.014 inch (0.36 mm) between adjacent bars 44 has been found suitable. This spacing 58 permits free passage of filtered effluent gases, but substantially prevents passage of the particles of filter material 28 between adjacent ones of the vertical bars 44, while still avoiding any problem of particles of lignocellulosic filter material 28 becoming lodged between adjacent vertical bars 44 of the grid.

To be compatible with various sources of effluent gas, the capacity of the apparatus 20 is variable by inserting additional panel sections to increase the height of the filter beds 24 and 26.

In order to move the filter material controllably downward through the filter beds 24 and 26, grids 40 and 42 are suspended in a manner permitting reciprocating vertical movement. For example, double-acting hydraulic cylinder and piston assemblies 60 and 61 may be used to support each grid 40 or 42, the cylinder and piston assemblies extending from a support structure at the top of the filter apparatus to attachment points at the top of each grid 40 or 42. The vertical side edges of each grid 40 and 42 are provided with suitable guides and seals to prevent exhaust of effluent gas from the filter bed except through the filter material 28.

Reciprocal vertical movement of the grids 40 and 42, aided by the force of gravity and the effect of the arrangement of the louvers, provides a generally downward travel of filter material within the respective filter bed 24 or 26, since the weight of the filter material 28 and the orientation of the louvers 36 oppose upward movement of the filter material 28.

The upward convexity and the inclination of the louvers 36 provides a wedging effect contributing to bridging of the filter material between the louvers and the grids, which resists increased compaction of the filter material in the lower portions of the filter beds, yet does not prevent downward movement of the filter material 28 as room is made available at the bottom of the filter beds 24 and 26. As a result, density of the filter material 28 is fairly uniform throughout the entire height of each filter bed 24 or 26, rather than the filter material being tightly compressed at the bottom and relatively loose at the top.

As the grids 40 and 42 move up and down, pollutant-laden filter material 28 from the surface of the filter material exposed between the louvers 36 is mixed in with the interior filter material. The curved upper surfaces 62 of the louvers 36, particularly at the lower edge 38 of each louver 36 form a long narrow wedge-shaped body 64 of filter material 28 which is drawn into and mixed with other filter material 28 as it moves downward. The lower edge 38 of each louver 36, moreover, helps prevent upward movement of the filter material 28 during the upward movement of the grid 40 or 42.

At the bottom of the apparatus 20 an inverted "V"-shaped bottom member 65 extends upwardly into the gas inlet chamber 30, each side of the "V" sloping downward toward the respective gas inlet side 33 of one of the filter beds 24 or 26 to direct any loose filter material 28 toward the interior of the respective filter bed 24 or 26. Each filter bed 24 or 26 extends downwardly below the level at which the "V"-shaped bottom surface meets the louvered gas inlet side 33, helping to seal against unwanted escape of effluent gas through the bottom of each filter bed 24 or 26.

Figure 7:
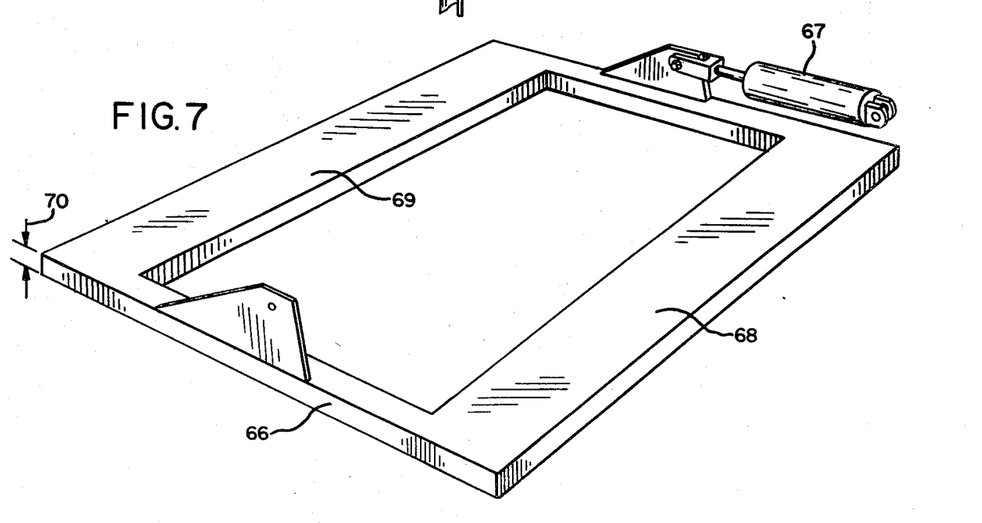
FIG. 7 is a pictorial view of an exemplary shuttle mechanism included in the apparatus shown in FIG. 1.

A shuttle mechanism 66 is provided in the bottom of the apparatus 20 for metering the flow of filter material through the apparatus by positively displacing a quantity of filter material from the bottom of each filter bed 24 and 26 at periodic intervals determined by the needed rate for refershing the filter material. As may be seen in FIG. 7, at each end of the shuttle 66 is a horizontal pusher 68 or 69 which is large enough to cover the open bottom of one of the filter beds 24 or 26. Each pusher 68 and 69 has a vertical height 70 which is approximately equal to the stroke length of vertical movement of the grid 40 or 42 of the filter bed 24 or 26, for example, six inches. The pushers 68 and 69 are separated from one another by a distance at least equal to the separation between filter beds plus the horizontal distance from gas inlet side 33 to gas outlet side 34 of the filter bed, so that when one pusher 68 is located directly beneath a respective one of the filter beds 24 or 26, the other pusher 69 is clear from a position beneath the filter bed, thus permitting a quantity of filter material 28 to move downwardly into the space adjacent to the pusher 69.

Each filter bed 24 and 26 extends vertically beyond the top and bottom of the gas inlet chamber 30, and waste lignocellulosic material, the filter material 28 filling these portions of the filter beds, seals the top and bottom of each filter bed to prevent gas leakage without use of complex mechanical seals. In a preferred embodiment, for example, a depth of about 4 feet of hog fuel was found to be sufficient for sealing the filter apparatus.

At the bottom of each filter bed 24 or 26, below the level of the bottom of the shuttle 66, a dump gate 72 is provided. Each dump gate 72 is hingedly mounted to permit it to move between a normal horizontal closed position and a vertical open position, in which the bottom of the respective filter bed 24 or 26 is open to permit quickly dumping the filter material 28 from that filter bed. The dump gates 72 are preferably remotely operable, as by hydraulic cylinder and piston assemblies 74.

A hopper 76 is located below the gas inlet chamber 30 and below the level of the shuttle mechanism 66, to receive filter material 28 at it is discharged from the bottom of each filer bed. A discharge conveyor 78, which may be of the endless chain type, is located below the hopper 76 to transport used filter material 28 away from the filter/dryer apparatus 20. Since the filter material 28 is dried substantially during its downward passage through the filter beds 24 and 26, and has additionally accumulated upon its surfaces quantities of imperfectly burned fuel filtered from the effluent gases passed through the filter/dryer apparatus 20, this filter material 28 may thereafter be used exceptionally economically as a fuel.

Figure 8:
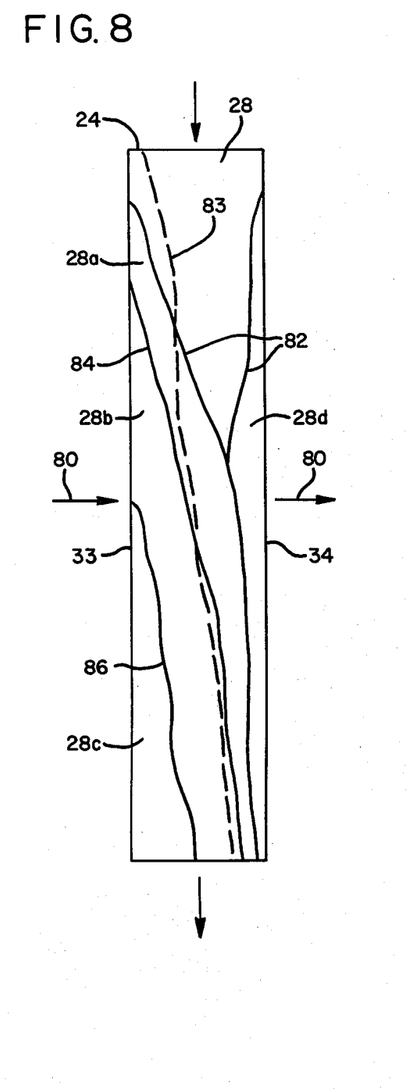
FIG. 8 is a partially schematic cross-sectional view of a filter bed of apparatus according to the present invention, showing distribution of moisture in the filter material during operation of the apparatus.

Referring now to FIG. 8, showing schematically a vertical cross section of one of the filter beds, with the gas inlet side 33 represented as the left side of the figure and the gas outlet side 34 as the right side of the figure, the temperature and moisture distribution profile in a typical situation during operation of the filter/dryer apparatus 20 of the present invention is illustrated. Contours of uniform moisture content are illustrated in decreasing order as solid lines 82, 84 and 86, respectively. Dashed line 83 is an exemplary constant temperature contour.

Filter material 28 entering at the top of the filter bed 24 is typically uniformly moist, for example, having a moisture content of 50% by weight. As effluent gas, for example exhaust stack gas from a boiler furnace, passes into the filter bed and through the filter material 28, the filter material 28a,b,c on the gas inlet side 33 is gradually dried with respect to the filter material 28d located adjacent the gas outlet side 34, and its temperature is simultaneously gradually increased.

As the stream of pollutant-containing effluent gas passes through the filter material in the direction indicated generally by the arrows 80, the pollutant particulates and condensible volatile materials are deposited upon the surfaces of the particles of filter material and the effluent gas passes out of the filter bed through the gas outlet side 34 in a relatively very clean state, at a reduced temperature and containing an increased amount of moisture which has been evaporated from the filter material 28.

During this process of filtration of the stream of effluent gas and drying of the filter material, the moisture distribution within the filter material 28 changes, as the hot effluent gases evaporate moisture from the filter material 28a, 28b, and 28c located nearer to the inlet side of the filter bed, and a portion, but less that all, of this moisture recondenses in the filter material 28d located nearer to the gas outlet side 34 of the filter bed, thereby maintaining the portion 38d at a moisture content actually higher than that of the filter material 28 entering the top of the filter bed 24. It is believed that the ability of efficiently filter extremely small particulate and condensible volatile materials from a stream of effluent gas according to the method of the present invention is due in large part to the process of initial evaporation of moisture originally contained in the filter material 28a, b, c followed by a portion of the evaporated moisture condensing on suspended pollutant particles in the filter material 28d extending over at least a major portion of the gas outlet side 34 of the filter bed.

Heat required to evaporate the moisture from the filter material 28a,b,c is taken partly from condensible volatile pollutants in the effluent gas, thereby condensing at least a portion of them and premitting the condensible materials to collect on the surfaces of pieces of filter material.

Because of the close spacing between adjacent vertical bars 44 of the grid 40 on the gas outlet side 34 of the filter bed 24, no significant amounts of particulate filter material can pass out of the filter bed outlet side, and the increased moisture content in the filter material adjacent to the outlet side of the filter bed provides an enhanced scrubbing effect removing substantially all remaining particulate matter and condensible volatiles from the stream of effluent gas once it has proceeded to the gas outlet side of the filter bed. The small amounts of filter material and particulate pollutants which do pass through the grid can be rinsed away occasionally by the water sprays 57.

The progress of filter material downward through the filter bed is maintained according to the present method at a sufficiently high rate to insure that the filter material does not become so dry that the moisture content of the filter material 28d, adjacent to the gas outlet side 34 of the filter bed 24, is decreased to the moisture content of the entering filter material. Conversely the rate is maintained sufficiently low to insure that the average moisture content of the filter material leaving the bed at the bottom thereof has been reduced to a satisfactory level for further utilization. Thus, the moisture content of the filter material 28d adjacent to the outlet side of the filter bed is typically as high as 70%, while the moisture content of filter material 28c adjacent to the gas inlet side 33 of the filter bed 24 may be lower than 5% at locations near the bottom of the filter bed 24, producing an average moisture content of filter material leaving the bed which is significantly lower than that of filter material entering the bed.

For example, moisture within the filter material 28 may be approximately 50% in the entering filter material 28, as shown in FIG. 8, with a zone of greater than 50% moisture content in the filter material 28' located adjacent the gas outlet side 34 of the filter bed 24, and decreased moisture content in the lower portions 28a, 28b and 28c of the filter material with the lines 82, 84, and 86 representing approximately the 50%, 35% and 5% moisture contours respectively.

Figure 9:
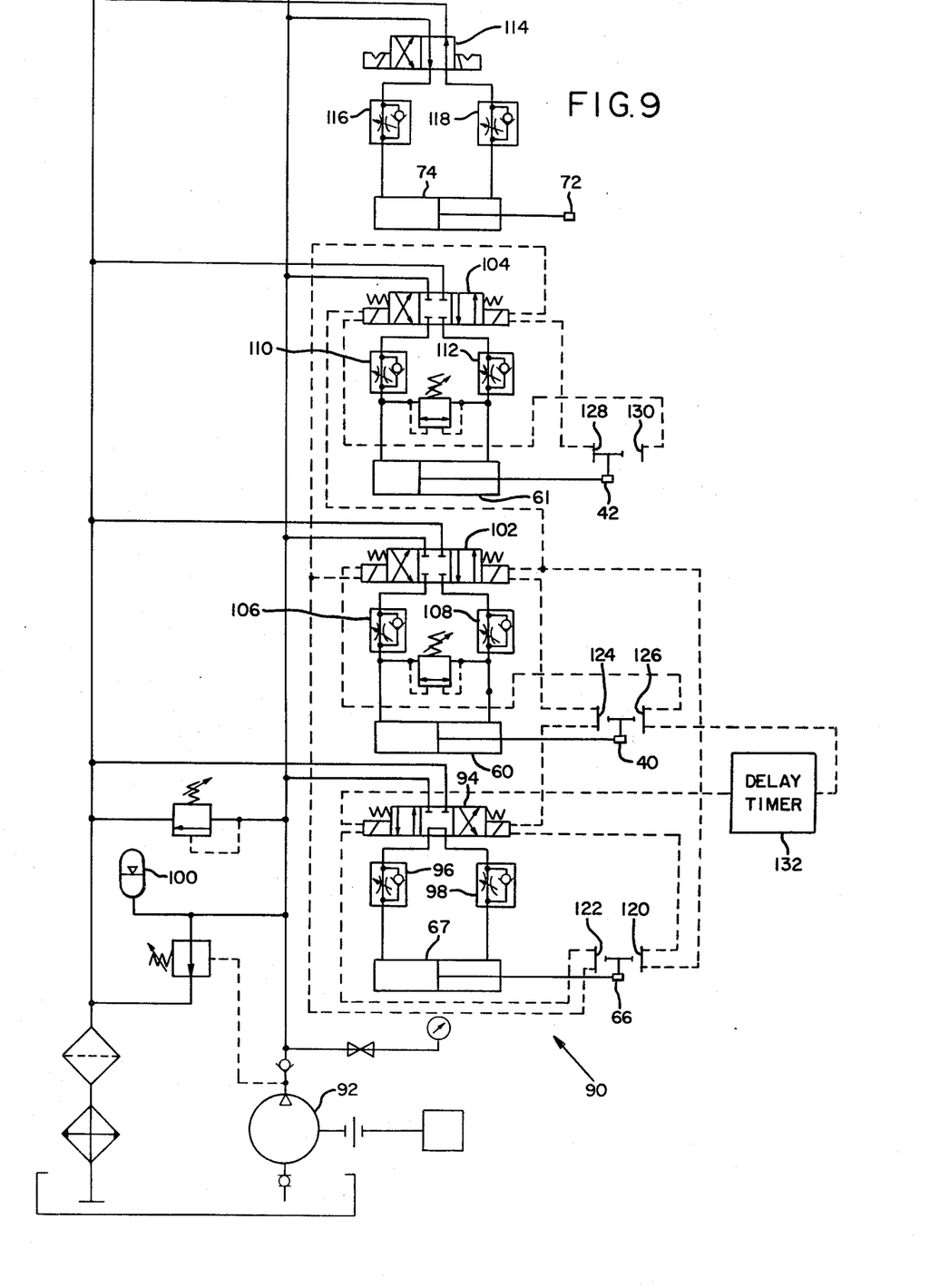
FIG. 9 is a schematic representation of an exemplary electro-hydraulic control system for moving the vertical grid of the gas outlet side of the filter bed in the apparatus of FIG. 1.

A control system such as the electro-hydraulic system 90 shown schematically in FIG. 9 is preferably utilized to control movement of the filter material 28 through the filter beds 24 and 26.

A hydraulic pump 92 provides hydraulic pressure directed by a spring centered solenoid-operated spool valve 94 to control motion of the cylinder and piston assemblies 67 of the shuttle assembly 66. Adjustable flow controlling valves 96 and 98, each having an associated reverse flow bypass valve, control the speed with which the shuttle 66 moves in each direction. An accumulator 100 is provided to maintain system pressure during movement of the system components.

Hydraulic fluid supplied to cylinder and piston assemblies 60 and 61, which respectively move the grids 40 and 42 on the gas outlet side 34 of each of the filter beds 24 and 26, is controlled by similar spring centered solenoid operated valves 102 and 104. Adjustable flow control valves 106, 108, 110, and 112, each equipped with a reverse flow bypass valve, are associated with respective ends of the cylinder and piston assemblies to control speed of movement of the grids 40 and 42 in each direction.

A manually operable valve 114 controls the position of hydraulic cylinder and piston assemblies 74, which position the dump gates 72. Adjustable flow control valves 116 and 118, equipped with reverse flow bypass valves, limit the speed of dump gate 72 operation.

Limit switches 120, 122, 124, 126, 128, and 130, associated with the shuttle assembly 66 and the grids 40 and 42, operate relays (not shown) to control the sequence of operation of the valves 94, 102 and 104. An adjustable delay timer 132 is also incorporated in the circuit to control adjustably the overall rate of progress of filter material 28 through the filter beds 24 and 26.

Figure 10A:
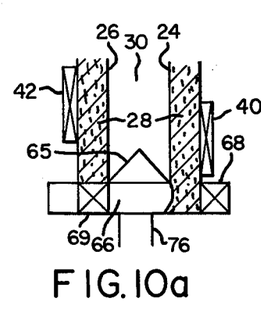
FIGS. 10a–10f are simplified representations of the filter/dryer apparatus of FIG. 1, illustrating the sequence of operation for moving filter material through the filter beds.
Figure 10B:
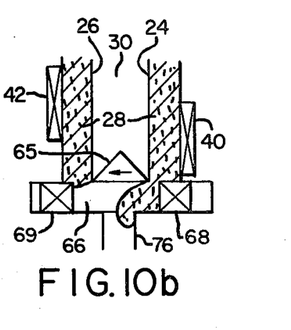
Figure 10C:
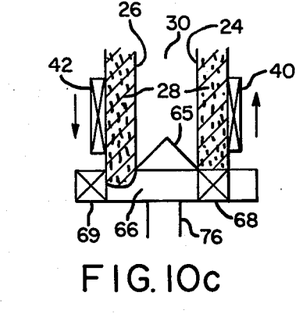
Figure 10D:
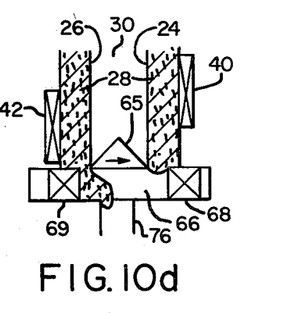

The sequence of operation is initiated by the position of the shuttle assembly 66. In an initial position shown in FIG. 10a, the grid 40 is down, the grid 42 is up, and the shuttle 66 is in its extreme right position with the pusher 69 beneath the filter bed 26 and the pusher 68 clear from beneath the filter bed 24. Upon activation of the feed system, the valve 94 is actuated by a solenoid to begin moving the shuttle assembly 66 to the left, as shown in FIG. 10b. As the shuttle assembly approaches the limiting position, shown in FIG. 10c, it operates the limit switch 120, deactivating the valve 94 and operating the valves 102 and 104, controlling the grid cylinder and piston assemblies 61 and 62 of the filter beds 24 and 26, raising the grid 40 and lowering the grid 42. (FIG. 10c) The grids 40 and 42 move at rates controlled respectively by the adjustable flow control valves 108 and 110 until the grids respectively actuate the limit switches 124 and 130. The relays operated by these limit switches allow the spools of the valves 102 and 104 to return to center, holding the grids 40 and 42 in the positions shown in FIG. 10c, and also actuate the solenoid operated valve 94, causing the shuttle assembly 66 to move to the right as shown in FIG. 10d, moving filter material 28 from beneath the filter bed 26, and leaving and opening at the bottom of the filter bed 24.

Figure 10E:
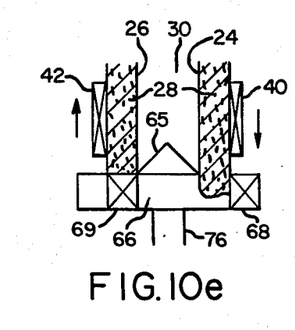
Figure 10F:
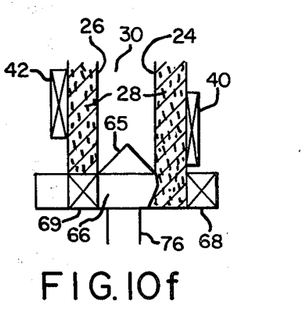

As the shuttle 66 approaches the limiting position shown in FIG. 10e, it operates the limit switch 122. This deactuates the valve 94 and actuates the solenoid-operated valves 102 and 104 connected to the feed screen cylinder and piston assemblies 60 and 61, causing the grid 42 to rise and the grid 40 to descend. As the grids 40 and 42 reach their limiting positions, they actuate limit switches 126 and 128, deactuating the valves 102 and 104 and stopping the grids' movement. The switch 126 also operates a relay (not shown) starting the delay timer 132 when the mechanism is in the position shown in FIG. 10f. After the timed delay the control circuit is again completed, initiating a repetition of the cycle described.

As each grid 40 and 42 rises, it slips along the adjacent surfaces of the filter material 28, which stays relatively stationary under the influence of gravity. Once the respective shuttle pusher 68 or 69 has moved from beneath the column of filter material 28 in that filter bed 24 or 26, however, and the respective grid 40 and 42 begins to descend, the combined effects of the friction between the grid and the adjacent filter material 28 and the force of gravity are sufficient to move the filter material 28 downward within the filter bed. The downwardly and inwardly angled orientation of the louvers 36 permits filter material 28 to slide down along the upwardly and inwardly convex curved upper surfaces of the louvers 36 as the material proceeds downward within the filter bed. The curvature of the louver surfaces also promotes mixing of the particles of filter material 28, exposing surfaces of the filter material 28 which have not yet been contaminated with the pollutants filtered from the stream of effluent gas. This mixing of the filter material 28 adjacent to the gas inlet side 33 of the respective filter bed not only presents fresh filter material surfaces to which pollutants can easily adhere, but helps to avoid danger of ignition, by protecting the driest filter material from the highest temperatures of the effluent gases being filtered.

As each pusher 68 or 69 of the shuttle assembly 66 moves toward the center of the apparatus 20 during each cycle, the filter material 28 pushed ahead of it slides toward the bottom of the hopper 76, from which it is carried away by the discharge conveyor 78.

If it is desired to dump all of the filter material from the filter bed at one time, the dump gates 72 may be opened hydraulicly by manual actuation of the valve 114 (FIG. 9), when the respective pusher is clear from beneath the filter bed, permitting all of the filter material 28 to quickly fall from the filter bed 24 or 26.

In operation of the apparatus shown in FIGS. 1–7, adequate quantitites of the comminuted lignocellulosic material to be used as filter material 28, are conveyed by conventional conveyors to distribution chutes above the filter beds 24 and 26 through which the filter material drops into the filter beds 24 and 26, keeping them full.

Once the filter beds 24 and 26 have been filled with comminuted lignocellulosic material, a stream of gaseous stack effluent, for example flue gas from the combustion chamber of a boiler furnace, is permitted to flow through the gas inlet conduit 32 toward the gas inlet sides 33 of the filter beds 24 and 26. If the temperature of the flue gas is high enough to ignite the comminuted lignocellulosic material contained in the filter beds, the previously mentioned heat exhanger or sprays are operated by thermostatic control, thereby cooling the flue gas to a predetermined temperature, for example 400°

F., (204° C.), which is low enough to prevent ignition of the lignocellulosic filter material 28 contained in the filter beds 24.

The temperature at which the gaseous effluent is fed into the gas inlet chamber 30 is high enough to evaporate moisture from within the lignocellulosic filter material 28 as the gaseous stack effluent passes through the filter beds 24 and 26. As a result, the filter material 28 is dried as it filters suspended matter from the gaseous effluent. Dried and contaminated material 28 is removed, making room for fresh moist filter material, by cycling the shuttle assembly 66 and grids 40 and 42.

The gaseous stack effluent can normally be passed through the filter beds 24 and 26 of the apparatus 20 without unacceptable pressure reduction. This results from the observed phenomenon that gas flows through a non-compacted filter bed of a given thickness of flake-like particles with less pressure reduction, when gas flow is generally in a direction substantially perpendicular to the direction of movement of the filter material 28 in the filter bed, than when gas flow is in a direction parallel to such direction of filter material movement.

At appropriate intervals the grids 40 or 42 of outlet side 34 of the filter beds are cycled up and down, and the shuttle assembly 66 is cycled horizontally, permitting a portion of the comminuted lignocellulosic filter material 28 to fall downward from the filter beds 24 and 26 onto the discharge conveyor 78. This establishes a rate of flow may be varied depending on the factors previously discussed. The conveyor carries the used filter material 28 and the pollutant materials such as fly ash and unburned hydrocarbons which have been filtered from the stream of gaseous effluent and accumulated on the surfaces of the filter material 28. The filter material, accompanied by the materials filtered from the stream of gaseous effluent, is fed into the combustion chamber of the boiler furnace, at the rate required by the furnace, and burned. An appreciable quantity of partially burned material is thus returned to the boiler furnace to be completely consumed, increasing fuel use economy of the furnace and reducing the amount of material which must be discarded as, for example, land fill.

The following example will further illustrate the method of the present invention:

EXAMPLE 1

Comminuted lignocellulosic material in the form of hogged wood waste from sawmill and veneer mill operations was used as a filter material in apparatus comparable to the filter apparatus 20 shown in FIGS. 1-5. The filter beds 24 and 26 were approximately 10 feet in height and 8 feet in width and included a layer of comminuted lignocellulosic filter material about 12 inches (30.5 cm) thick. The grids 40 and 42 included vertically oriented bars separated by spacing 58 of 0.014 inch (0.36 mm). When placed in the filter beds 24 and 26 the moisture content of the filter material 28 was about 50%-60% by weight. The effluent stack gas, from the combustion chamber of a boiler providing about 40,000 pounds of stream per hour for operation of sawmill and veneer mill operations, was cooled to approximately 400° F. (204° C.) and conducted through the gas inlet conduit 32 into the gas inlet chamber 30. After passing through the filter beds and the filter material 28, the gaseous stack effluent had been cooled to about 140° F. (60° C.). It was essentially free of particulate pollutants, and had negligible opacity, the lack of opacity indicating removal of particles including those of submicron size. Particulate grain loading of the filtered gas was approximately 0.02 grains per cubic foot of filtered gas. The filter material was moved downwardly through the filter beds 24 and 26 at a rate of about 20 feet per hour, maintaining the moisture content of the filter material adjacent the gas outlet side of the apparatus at approximately 70% or more by weight, while the material closer to the gas inlet side was dried considerably. The filter material 28 from the bottom of the filter beds 24 and 26, dried to an average moisture content of 30%-35%, was dumped into the discharge conveyor 78 below the filter apparatus 20. The dried filter material 28, carrying the accumulated pollutants, was then conveyed to the boiler furnace fuel feeding apparatus and introduced into the furnace of the boiler where it was burned.

The examples, terms and expressions which have been employed in the foregoing specification are used therein for description and are not intended in any way to limit the scope of the invention nor exclude equivalents of the methods and features shown and described or portions thereof, it being recognized that the scope of the invention is defined and limited only by the claims which follow.

What is claimed is:

1. A method for filtering a stream of gas, utilizing comminuted lignocellulosic waste material as filter material while drying the lignocellulosic waste material, comprising:
   (a) introducing a quantity of filter material, comprising comminuted lignocellulosic waste material at a predetermined average input moisture content, downwardly into a generally upright filter bed having gas inlet and gas outlet sides respectively;
   (b) passing a stream of gaseous effluent containing combustible pollutants through said filter bed and said filter material contained therein, in a generally horizontal direction by introducing said gaseous effluent into the gas inlet side thereof and exhausting said gaseous effluent from the gas outlet side thereof, thereby causing said pollutants to accumulate on the surface of said filter material while simultaneously evaporating moisture into said gaseous effluent from a first portion of said filter material adjacent the gas inlet side of said filter bed;
   (c) prior to exhausting said gaseous effluent from the gas outlet side of said filter bed, condensing from said gaseous effluent a portion, less than all, of the moisture evaporated from said first portion of said filter material so as to maintain a second portion of said filter material, extending over at least a major portion of the gas outlet side of said filter bed, at a higher moisture content than said predetermined average input moisture content.

2. The method of claim 1, including the steps of removing said filter material from the bottom of said filter bed and introducing additional filter material at the top of said filter bed at a rate high enough to maintain said second portion of said filter material at said higher moisture content but low enough to reduce the average moisture content of filter material removed from the bottom of said filter bed to a predetermined value lower than said predetermined average input moisture content.

3. The method of claim 2 including the further step of moving said filter material downwardly through said filter bed by alternatingly raising and lowering said gas outlet side of said filter bed while periodically removing a quantity of said filter material from the bottom of said filter bed.

4. The method of claim 1, including the further step of inhibiting compaction of said filter material in said filter bed by providing a plurality of generally horizontally extending louvers at a plurality of levels on said gas inlet side of said filter bed and sloping said louvers upwardly away from said filter material, thereby causing said filter material to bridge the space between said gas inlet side and said gas outlet side of said filter bed at said said plurality of levels.

5. Filter/dryer apparatus for containing a quantity of comminuted lignocellulosic waste material for use as a filter material for filtering a stream of pollutant-laden gaseous effluent, comprising:

(a) generally upright filter bed means for containing a quantity of a filter material and permitting passage of a stream of gaseous effluent containing particulate pollutants generally horizontally therethrough;

(b) means for introducing a quantity of waste lignocellulosic material into the top of said filter bed means as a filter material;

(c) upright means for defining a gas inlet side of said filter bed means, said upright means including a plurality of horizontally extending louvers arranged one above another and spaced closely enough together to prevent said filter material from spilling from within said filter bed means;

(d) gas-permeable means for defining a gas outlet side of said filter bed means, said gas-permeable means including a grid positioned and arranged to be generally vertically movable and having a plurality of closely spaced apart, generally vertically extending bars;

(e) motor means for reciprocatingly moving said grid upward and downward;

(f) shuttle means for periodically displacing a quantity of a filter material generally horizontally from the bottom of said filter bed means; and (g) means for correlating operation of said shuttle means with reciprocating movement of said grid.

6. The apparatus of claim 5 wherein said generally vertically extending bars of said grid are of generally triangular cross-sectional shape, said bars being arranged parallel to one another with a corresponding side of each of said bars being located substantially in a single plane on the side of said grid facing toward said gas inlet side of said filter bed means.

7. The apparatus of claim 6 wherein said parallel vertical bars define parallel vertically oriented openings therebetween, the width of each of said openings being minimum adjacent said side of said grid facing toward said gas inlet side of said filter bed means and greater at the side of said grid facing away therefrom, said minimum width being about 0.014 inch.

8. The apparatus of claim 5 wherein said louvers are sloped upwardly away from the gas outlet side of said filter bed means and are upwardly convex in shape.

9. The apparatus of claim 8 wherein said louvers include respective lower edges which extend substantially vertically downward and upper portions which extend curvingly away from the gas outlet side of said filter bed means.

* * * * *